United States Patent [19]
Obata

[11] Patent Number: 5,341,462
[45] Date of Patent: Aug. 23, 1994

[54] FIGURE DRAWING METHOD AND APPARATUS FOR DRAWINGS ACCENTUATED LINES

[75] Inventor: Koei Obata, Shiga, Japan
[73] Assignee: Daikin Industries, Ltd., Osaka, Japan
[21] Appl. No.: 638,898
[22] Filed: Jan. 11, 1991
[30] Foreign Application Priority Data
 Jan. 11, 1990 [JP] Japan .................. 2-5516
 Apr. 19, 1990 [JP] Japan .................. 2-103925
[51] Int. Cl.⁵ .................. G06F 15/72
[52] U.S. Cl. .................. 395/122; 395/121; 395/131
[58] Field of Search .................. 395/122, 121, 131, 119
[56] References Cited

U.S. PATENT DOCUMENTS

| | | | |
|---|---|---|---|
| 4,481,594 | 11/1984 | Staggs et al. | 395/131 |
| 4,855,938 | 8/1989 | Gonzalez-Lopez et al. | 395/122 |
| 5,075,876 | 12/1991 | Seki et al. | 395/121 |
| 5,175,805 | 12/1992 | Carrie | 395/122 |
| 5,220,646 | 6/1993 | Fossum | 395/122 |

FOREIGN PATENT DOCUMENTS 63-15288 1/1988 Japan.

Primary Examiner—Heather R. Herndon
Assistant Examiner—Michael S. Smith
Attorney, Agent, or Firm—Beveridge, DeGrandi, Weilacher & Young

[57] ABSTRACT

A method fills a polygon and then draws edge lines while inhibiting renewal of only depth data in a depth buffer. Thereafter, a method fills the polygon while inhibiting renewal of only color data in a color buffer. The filling and drawing are performed by applying hidden surface removing processings based upon depth buffer algorithm.

4 Claims, 7 Drawing Sheets

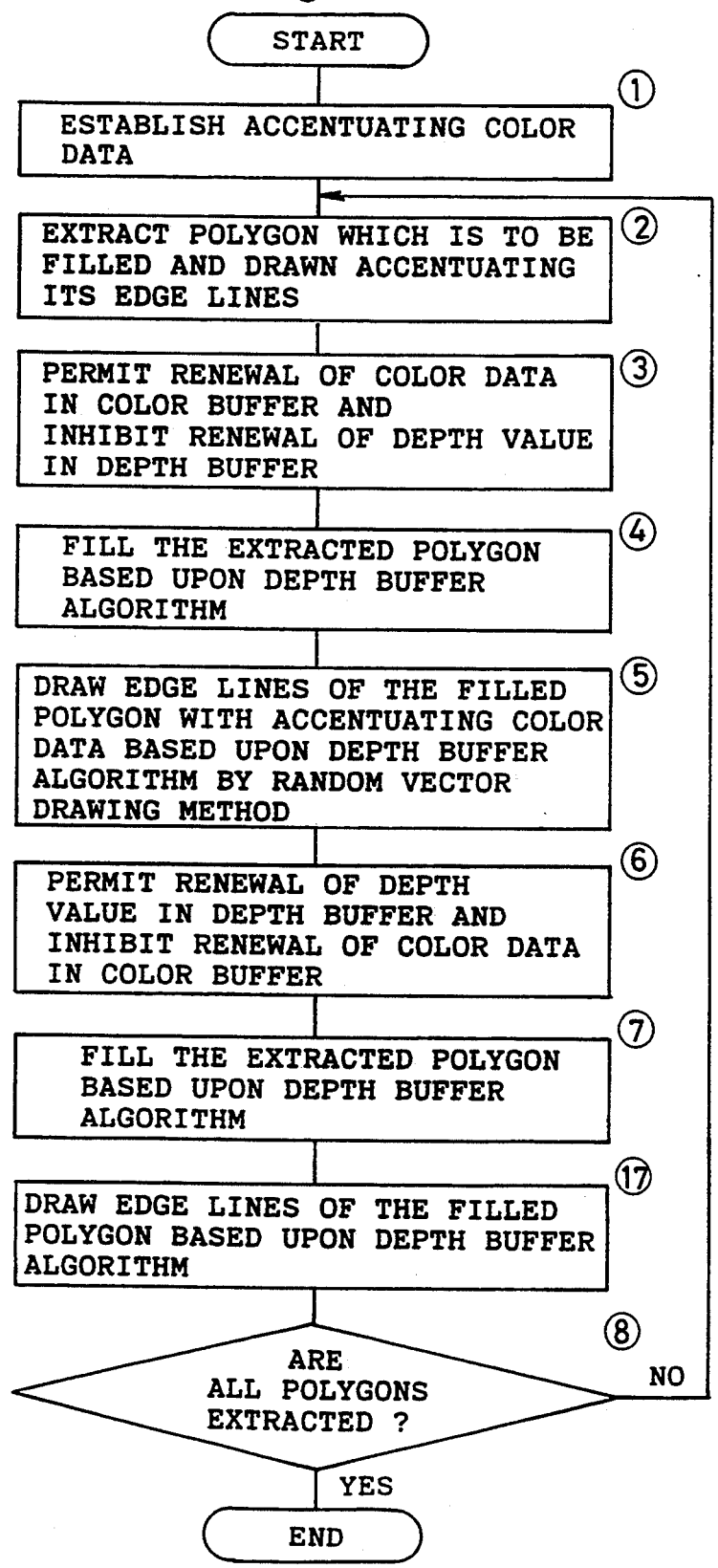

FIGURE DRAWING METHOD AND APPARATUS FOR DRAWINGS ACCENTUATED LINES

BACKGROUND OF THE INVENTION

The present invention relates to novel methods and apparatus for three dimensionally drawing polygons with filling and for drawing a desired figure over the polygons with accentuating.

In a graphics display apparatus, it is required that not only an object applied for display be merely displayed with filling but also that a unit polygon which constitutes an object be displayed with accentuating of its edge lines so as to easily visually recognize the size and control points and the like of the unit polygon.

When two dimensional polygons are displayed, edge lines of any of the polygons are easily displayed with accentuating and no disadvantage arises.

But when three dimensional polygons are displayed, a disadvantage arises in that the display of the edge lines having a predetermined width of the polygon with accentuating is remarkably difficult. More particularly, in the three dimensional graphics display apparatus, three dimensional feeling is generally represented by applying a hidden surface removal operation. When polygons are drawn with filling, depth data for each pixel of each polygon are calculated, then depth data for each pixel of a polygon are compared with depth data for corresponding pixels of other polygons, thereafter only necessary pixels are visually displayed. Now, when polygons are displayed with filling, depth data are interpolated in a scanning line direction, while when edge lines of a polygon are displayed with accentuating, depth data are interpolated in a edge line direction. Both depth data are not assured coincidence with one another. As a result, the disadvantage arises due to the lack of coincidence of both depth data that the disply quality of edge lines with accentuating is lowered, for example the edge lines may be displayed as dotted lines.

An apparatus is proposed to eliminate the disadvantage (Japanese Patent Laid Open Sho 63-15288). The apparatus first draws only edge lines of a polygon using a depth buffer algorithm and writes flag data into an edge-flag-memory which is used to control whether or not renewal of data stored in a depth buffer memory and a frame buffer memory is permitted. The apparatus then draws the polygon accentuating its edge lines with filling using the depth buffer algorithm and taking the flag data into consideration. The apparatus finally erases all flag data.

When the apparatus is employed, depth data and color data of the edge lines which are previously drawn are securely prevented from renewing despite the relationship between the interpolation operation results in the scanning direction and the interpolation operation results in the edge line direction. The disadvantage of the edge lines being displayed as dotted lines and the like is eliminated when the edge lines are displayed with accentuating for every polygon.

When polygons with their edge lines accentuated and regular polygons exist, depth data of edge lines may be different from depth data in the scanning line direction. The disadvantage arises that the edge lines are partially hidden so as to display the edge lines as dotted lines when regular polygons are drawn with filling using hidden surface removal after polygons with their edge lines accentuated are drawn with filling.

When polygons are displayed as translucent polygons, every polygon must be applied sorting in a depth direction (hereinafter referred to as z-sorting). In this case, depth data of edge portion of polygons with their edge lines accentuated and depth data of edge portion of regular polygons are mixed on a pixel basis, the former depth data may be greater for a pixel and the latter depth data may be greater for another pixel. The disadvantage arises in that the z-sorting of polygons becomes impossible.

SUMMARY OF THE INVENTION

It is an object of the present invention to accentuate the display of an arbitrary figure over polygons with high quality when the polygons are three dimensionally drawn with filling.

This present invention first draws polygons by applying hidden surface removing processings based upon a depth buffer algorithm while inhibiting of renewal of only depth data in a depth buffer. Then, the invention draws a desired figure by applying hidden surface removing processings based upon the depth buffer algorithm. Thereafter, the invention draws polygons by applying hidden surface removing processings based upon the depth buffer algorithm while inhibiting of renewal of only color data in a color buffer and permitting renewal of depth data in the depth buffer.

When color data are generated for filling in accordance with addresses which are sequentially generated by a line segment generating means and polygons are filled by applying hidden surface removing operations based upon a depth buffer algorithm, the invention first draws polygons while inhibiting of renewal of only depth data in a depth buffer and the invention then draws a desired figure. In this condition, the contents of the depth buffer are the same as of the depth buffer which is not applied in the drawing operations while the contents of a color buffer corresponding to corresponding polygons and the desired figure is equivalent to the contents when the corresponding polygons and the desired figure are drawn two dimensionally. The desired figure is accordingly overwritten to the corresponding polygons. Thereafter, the invention draws polygons while inhibiting of renewal of only color data of the color buffer. The content of the depth buffer is accordingly renewed so as to suit the depth data to the drawn polygons.

It is preferred that polygons are drawn by applying hidden surface removing processings based upon the depth buffer algorithm with inhibiting of renewal of only color data and the desired figure is then drawn with applying of hidden surface removing processings based upon the depth buffer algorithm with inhibiting renewal of only color data.

The invention draws the desired figure and renews the contents of the depth buffer after the invention draws the polygons and renews the contents of the depth buffer, so as to suit the depth data to not only the polygons but also the desired figure. When a polygon is drawn accentuating its edge lines, edge lines may exist outside of the polygon. In this condition, depth data exist in the whole extent of the edge lines. The disadvantage can be eliminated so that edge lines are hidden by other polygons which are to be hidden by the edge lines.

The desired figure may be edge lines of a polygon. The desired figure may also be an arbitrary line segment which is to be drawn in the polygon. The desired figure may further be an arbitrary polygon which is to be drawn in the polygon.

An apparatus according to the present invention comprises;

pixel data generating means for individually outputting first pixel data which are necessary for filling polygons which constitute a three dimensional object and second pixel data which are necessary for drawing a desired figure;

linear interpolation means for interpolating three dimensional coordinates data of a line segment which constitutes the polygon and the desired figure based upon the three dimensional coordinates data included in each pixel data of edge points of the line segment;

Color data generating means for generating color data included in each pixel data corresponding to the three dimensional coordinates data of the line segment sequentially generated by the linear interpolation means;

a depth buffer for holding depth data included in the three dimensional coordinates data output from the linear interpolation means;

a color buffer for holding the color data output from the color data generating means;

repetition control means for controlling the pixel data generating means to repeat outputting of each pixel data; and renewal control means for selectively inhibiting renewal of the depth data and renewal of the color data corresponding to the number of times of the repetition of controlling by the repetition control means.

When the first pixel data are generated by the pixel data generating means for filling the polygon, the linear interpolation means sequentially generates three dimensional coordinates data and the color data generating means generates color data corresponding to the generated three dimensional coordinates data. The polygon is then three dimensionally filled by applying hidden surface removing operations based upon a depth buffer algorithm. Thereafter, when the second pixel data are generated by the pixel data generating means for drawing the desired figure, the linear interpolation means sequentially generate three dimensional coordinates data and the color data generating means generates color data corresponding to the generated three dimensional coordinates data. The figure is then three dimensionally drawn by applying hidden surface removing operations based upon a depth buffer algorithm.

When the filling of the polygons and drawing of the desired figure are performed for the first time, renewal of only depth data is inhibited by the renewal control means. The polygons and the desired figure are accordingly drawn in a overwriting manner, the depth data are then held as of the prior condition before starting drawing. When the filling of the polygons and drawing of the desired figure are performed for the next time, renewal of only color data is inhibited by the renewal control means. Only the depth data are accordingly renewed based upon the depth buffer algorithm. The contents of the depth buffer suit the drawn polygons and the drawn figure.

These and other objectives, features and advantages of the present invention will be more readily understood upon consideration of the present invention, taken in conjunction with the accompanying drawings.

BRIEF DESCRIPTION OF THE DRAWINGS

FIG. 4 is a flowchart for a polygon filling method with accentuating of its edge lines as another embodiment of a figure drawing method according to the present invention.

DETAILED DESCRIPTION OF THE PREFERRED EMBODIMENTS

Figure 1:
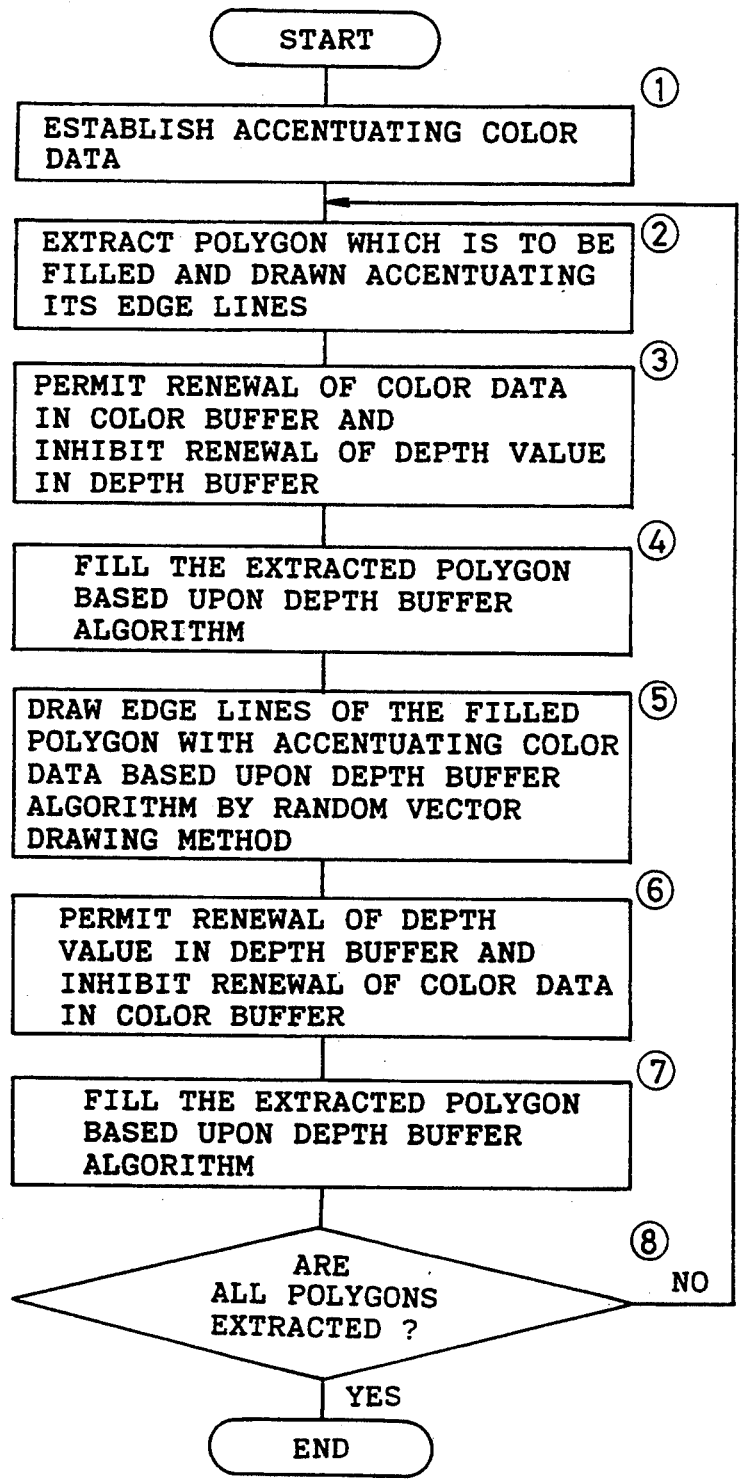
FIG. 1 is a flowchart for a polygon filling method with accentuating of its edge lines as an embodiment of a figure drawing method according to the present invention.

FIG. 1 is a flowchart for a polygon filling method with accentuating of its edge lines as an embodiment of a figure drawing method according to the present invention.

In step (1), color data for accentuating is established. In step (2), a polygon is extracted which is to be drawn with accentuating of its edge lines. In step (3), renewal of color data in a color buffer is permitted while renewal of depth value in a depth buffer is inhibited. In step (4), the extracted polygon is filled by hidden surface removing processings based upon the depth buffer algorithm. In step (5), edge lines of the filled polygon are drawn with the color data for accentuating by a random vector drawing method with hidden surface removing processings based upon the depth buffer algorithm. When the operations from step (21) to step (5) are performed, the polygon accentuated in its edge lines is drawn in the color buffer. Renewal of the depth value in the depth buffer is not performed at all through the processings mentioned above. The corresponding polygon is accordingly accentuated in its edge lines with high quality.

In step (6), renewal of depth value in the depth buffer is permitted while renewal of color data in a color buffer is inhibited. In step (7), the extracted polygon is filled by hidden surface removing processings based upon the depth buffer algorithm. When the operations of steps (6) and (7) are performed, the depth values are renewed with depth values which are obtained by performing interpolation processings in a filling direction within the whole extent of the extracted polygon. The contents of the color buffer and the contents of the depth buffer accurately correspond to one another.

After the operation in step (7) is finished, in step (8), a judgement is made as to whether or not all polygons are extracted, which are to be drawn with accentuation of their edge lines. When it is judged that there remains one or more polygons which are to be drawn with accentuation of their edge lines, the operation in step (2) is repeated. On the other hand, when it is judged in step (8) that all polygons are extracted, which are to be drawn with accentuation of their edge lines, the series of operations are then finished.

As to polygons without accentuation of their edge lines, the polygons are filled by hidden surface removing processings based upon the depth buffer algorithm under the condition that renewal of color data in the color buffer and renewal of depth value in the depth buffer are permitted.

Figure 2:
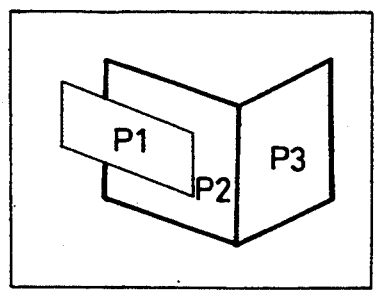
FIGS. 2-A1, 2-B1 to 2 B10 and 2-C2 to 2-C10 are diagrams useful in understanding a figure drawing method based upon a specific example.
Figure 2:
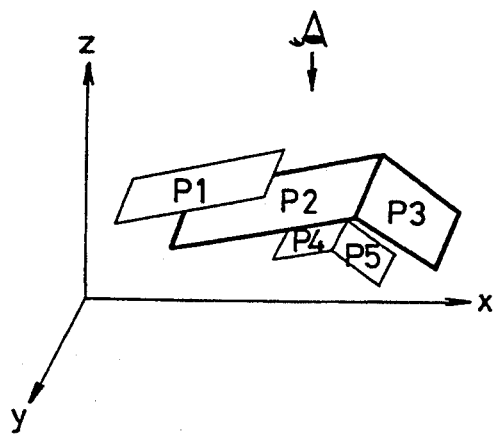
Figure 2:
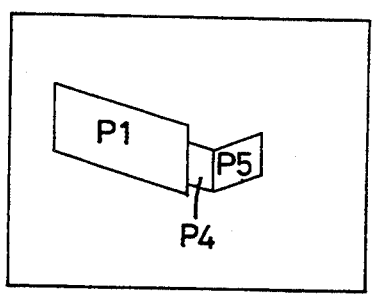
Figure 2:
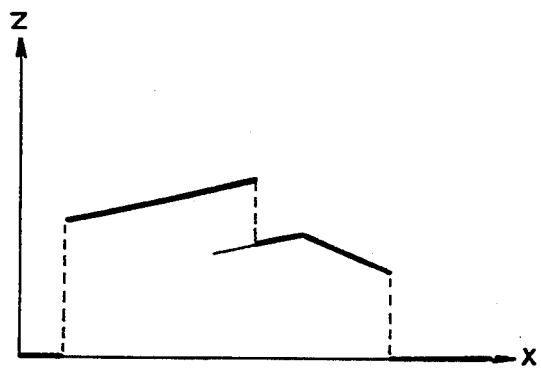
Figure 2:
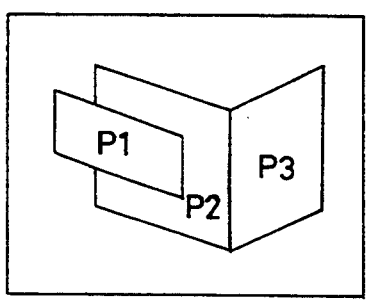
Figure 2:
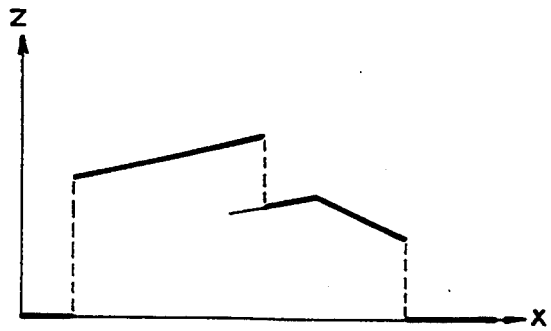
Figure 2:
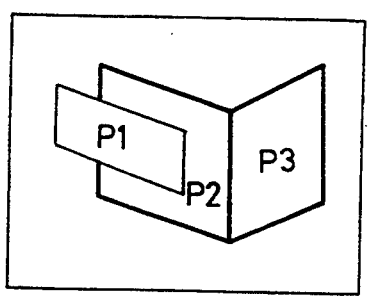
Figure 2:
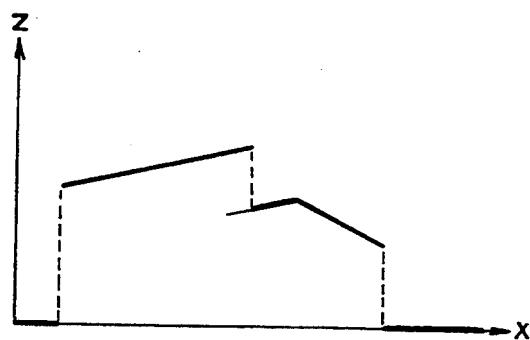
Figure 2:
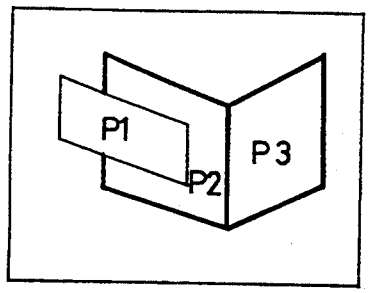
Figure 2:
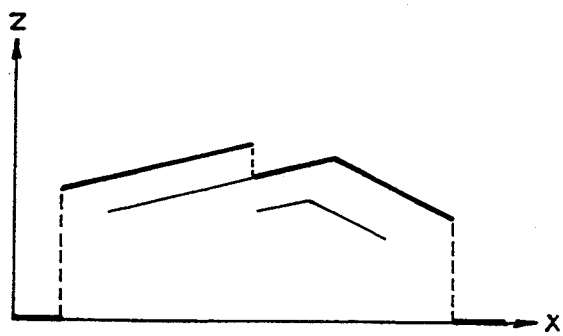
Figure 2:
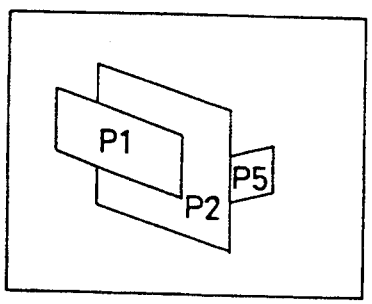
Figure 2:
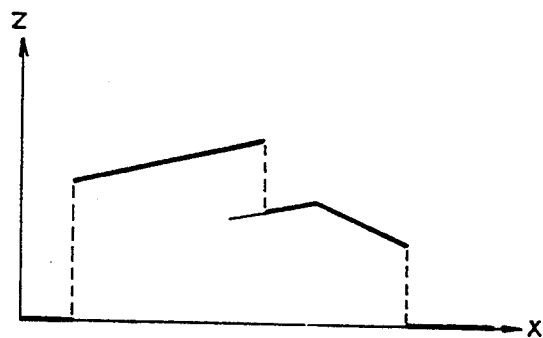
Figure 2:
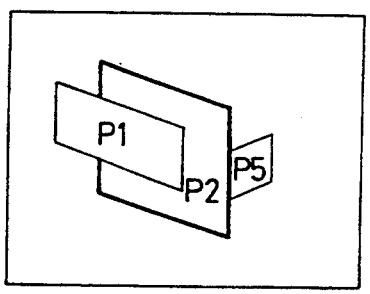
Figure 2:
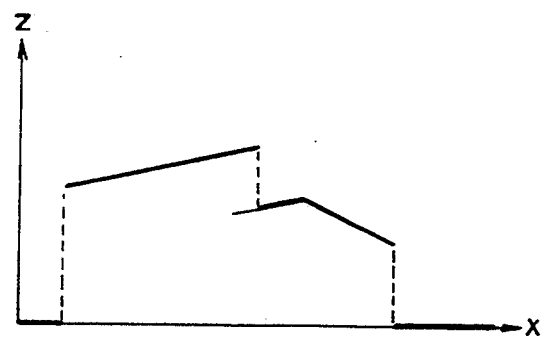
Figure 2:
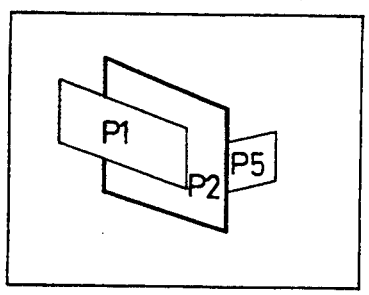
Figure 2:
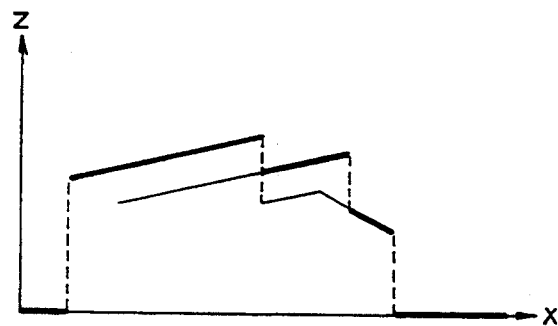
Figure 2:
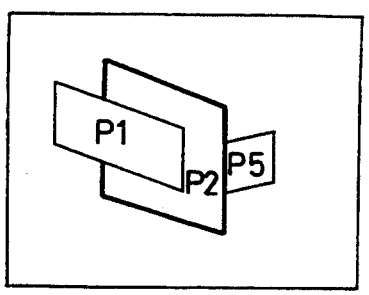
Figure 2:
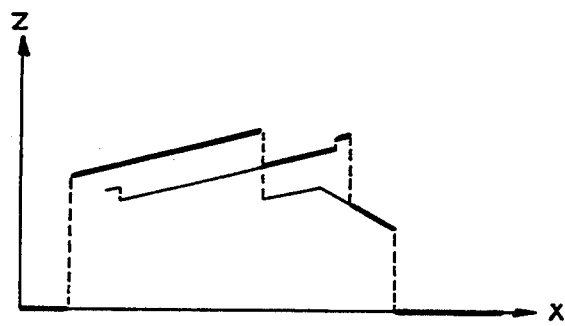
Figure 2:
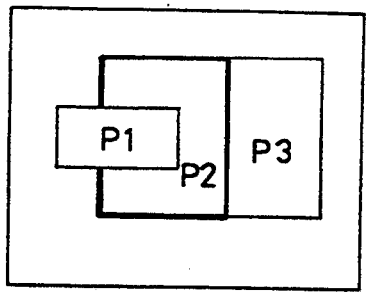
Figure 2:
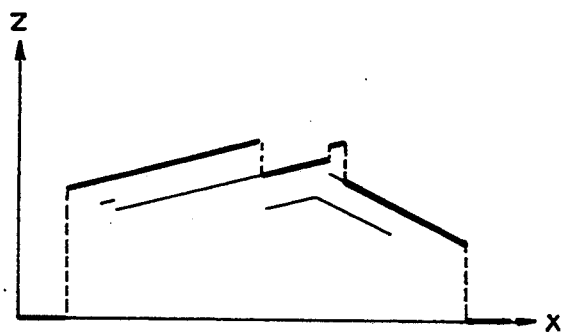

FIGS. 2-A1, 2-B1 to 2-B5 and 2-C2 to 2-C5 are diagrams useful in understanding the figure drawing method based upon a specific example.

FIG. 2-A1 shows five polygons P1, P2, P3, P4 and P5 which are disposed three dimensionally. And these polygons are displayed on a scope as shown in FIG. 2-B1. FIGS. 2-B2 to 2-B10 and 2-C2 to 2-C10 explain the operations to display the five polygons shown in FIG. 2-A1 on a scope shown in FIG. 2-B1. In the following description, drawing priority order of the polygons are determined as P1, P4, P5, P2, and P3, and only the polygons P2 and P3 are to be drawn with accentuating their edge lines.

Under this condition, the polygons P1, P4 and P5 are filled by the hidden surface removing processings based upon the depth buffer algorithm while permitting renewal of color data in the color buffer and renewal of depth value in the depth buffer. The polygons are accordingly displayed on the scope as is shown in FIG. 2-B2, while the contents of the depth buffer are determined as is shown in FIG. 2-C2. When the polygons P2 and P3 are drawn, filling operations of the polygons are performed by applying the hidden surface removing processings under the condition that renewal of the depth value in the depth buffer is inhibited. The polygons are accordingly displayed on the scope as is shown in FIG. 2-B3, while the contents of the depth buffer are determined as is shown in FIG. 2-C3.

Then, the edge lines of the polygons P2 and P3 are drawn with accentuation by applying the hidden surface removing processings under the condition that renewal of the depth value in the depth buffer is inhibited. The polygons are accordingly displayed on the scope as is shown in FIG. 2-B4, while the contents of the depth buffer are determined as is shown in FIG. 2-C4 which is the same as FIG. 2-C3. The edge lines must be drawn on the same locus taking into account the determination of the starting point and the end point. It is accordingly sufficient for example that the edge lines are drawn by determining a point having fewer coordinate values as the starting point.

Thereafter, the polygons are filed by applying the hidden surface removing processings under the condition that renewal of only color data in the color buffer is inhibited. The polygons are accordingly displayed on the scope as is shown in FIG. 2-B5 which is the same as FIG. 2-B4, while the contents of the depth buffer are determined as is shown in FIG. 2 C5 which corresponds to the actually displayed polygons P2 and P3.

As a result, the disadvantage is eliminated that the edge lines are displayed as dotted lines and the like, and the polygons with their edge lines accentuated are accordingly filled with high quality.

In the figure drawing method mentioned above, it is of course possible that filling a polygon in only the color buffer, drawing edge lines in only the color buffer and filling a polygon in only the depth buffer are repeated only for the polygons P2 and P3.

As is apparent from the foregoing, it is sufficient that ordinary filling and drawing processings are performed for each polygon by selecting the condition that renewal of the depth value in the depth buffer is inhibited and the condition that renewal of the color data in the color buffer is inhibited. It is not needed to especially determine different depth values from the ordinarily obtained depth value, accordingly. The illustrative drawing method is easily carried out without requiring extra equipment because the function of inhibiting renewal of data in each buffer is previously provided.

Second Embodiment

Figure 3:
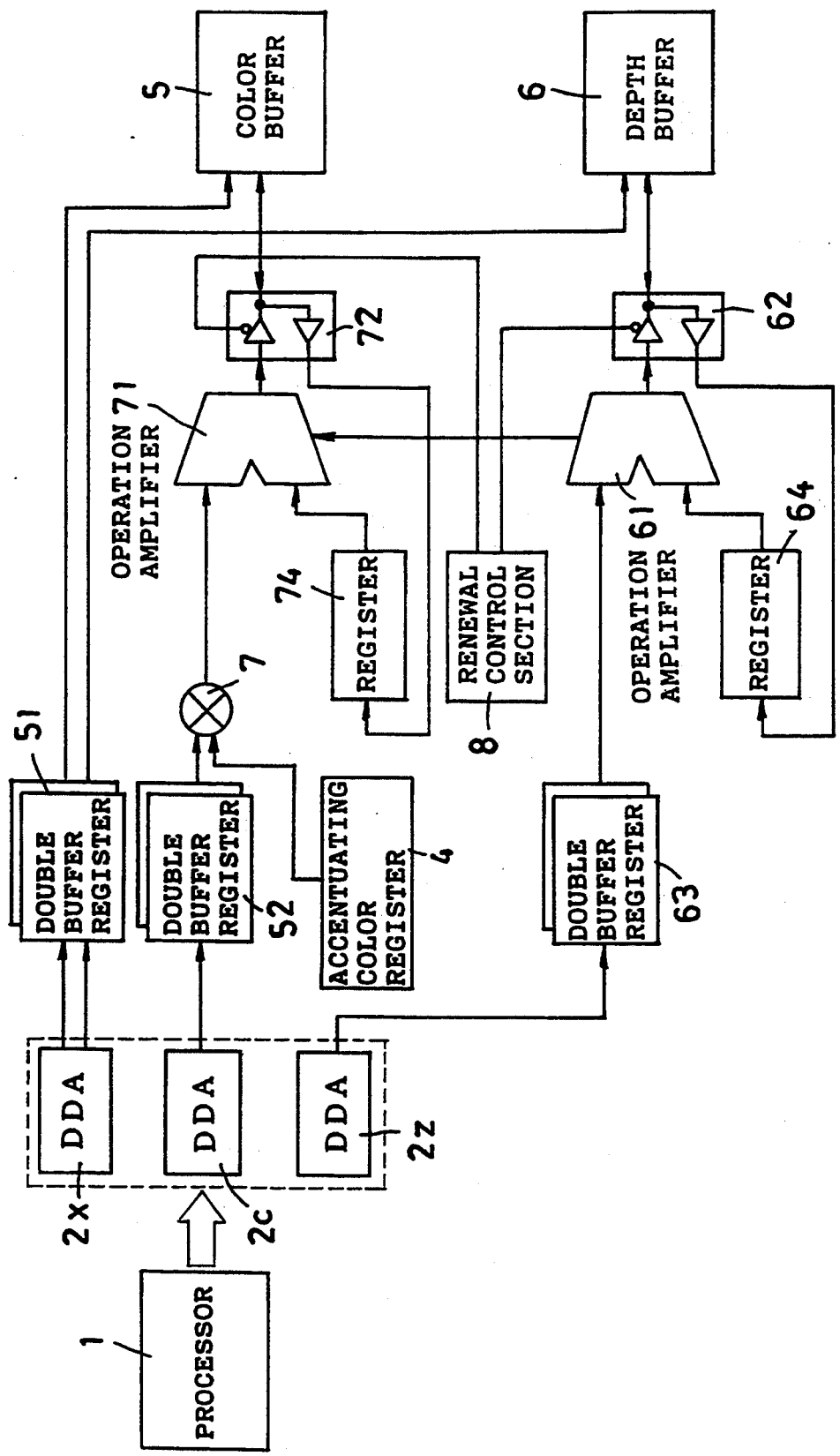
FIG. 3 is a block diagram showing a polygon filing apparatus with accentuating of its edge lines as an embodiment of a figure drawing apparatus according to the present invention.

FIG. 3 is a block diagram showing a polygon filling apparatus for accentuating its edge lines as an embodiment of an illustrative drawing apparatus according to the present invention.

The apparatus includes a processor 1 for outputting apex coordinates data and the like which are necessary for interpolation processings, interpolation operation devices (hereinafter referred to as DDA) $2x$, $2z$ and $2o$ for generating plane coordinates data, depth value and color data, respectively, based upon pixel data including the apex coordinates data and the like supplied from the processor 1, an accentuating color register 4 for holding accentuating color data which are used for drawing edge lines with accentuation, a color buffer 5 for storing color data which correspond to display figures, a depth buffer 6 for storing depth values which are part of the pixel data to perform hidden surface removing processings, a selector 7 for selecting the accentuating color data read out from the accentuating color register 4 or the color data generated by the DDA $2c$ and a renewal control section 8 for controlling inhibition and allowance of renewal of the depth value in the depth buffer 6 and renewal of the color data in the color buffer 5.

The plane coordinates data generated by the DDA $2x$ are supplied to the color buffer 5 and the depth buffer 6 through a double buffer register 51. The depth value generated by the DDA $2z$ in correspondence with the plane coordinates data are supplied to an input terminal of an operation amplifier 61, while the depth value road out from the depth buffer 6 through a bidirectional buffer 62 is supplied to another input terminal of the operation amplifier 61. The operation amplifier 61 judges which depth value is greater than the other depth value. One of the depth values which is determined based upon judgement conditions is again written into the depth buffer 6 through the bidirectional buffer 62. a flag indicative of the judgement result is output from the operation amplifier 61 and is supplied to an operation amplifier 71 for the color buffer 5 as a selection control flag. The color data output from the selector 7 are supplied to an input terminal of the operation amplifier 71, while the color data read out from the color buffer 5 are supplied to another input terminal of the operation amplifier 71. The operation amplifier 71 selects one of the color data based upon the selection control flag and writes the selected color data into the color buffer 5 through the bidirectional buffer 72.

The processor 1 functions as a repetition control means. The processor 1 alternatively repetitively supplies necessary data to the DDAs so as to generate necessary pixel data once when polygons are ordinarily filled, while the processor 1 supplies necessary data to the DDAs so as to generate pixel data twice which are necessary for filling polygons and to generate pixel data once which are necessary for drawing edge lines when polygons are filled and drawn with accentuation of their edge lines.

The renewal control section 8 controls data writing through the bidirectional buffers 62 and 72. The renewal control section 8 permits data writing through the bidirectional buffers 62 and 72 when polygons are ordinarily filled. On the other hand, the renewal control section 8 performs a control operation as follows when polygons are filled and drawn accentuating their edge lines. The renewal control section 8 inhibits data writing only through the bidirectional buffer 62 when polygons are filled for the first time and edge lines are drawn. The renewal control section 8 inhibits data writing only through the bodorectional buffer 72 when polygons are filled for the second time.

Reference numerals 52 and 63 indicate double buffer registers and the reference numerals 64 and 74 indicate registers for temporarily holding data read out from the corresponding buffers 6 and 5.

The operation of the apparatus having the arrangement described above is as follows.

First, renewal of depth value, or writing the depth value, of the depth buffer 6 is inhibited by the renewal control section 8 and the DDAs 2x, 2z and 2o are operated to interpolate polygons which are to be filled and drawn with accentuation their edge lines. The output data (color data) from the DDA 2o which are selected by the selector 7 are written into the color buffer 5 by applying the hidden surface removing processings and without influencing the content of the depth buffer 6 because only the sequentially generated depth value are inhibited from writing into the depth buffer 6, while the hidden surface removing processings and renewal of color data are not inhibited. Then, the DDAs 2x, 2z and 2o are operated maintaining inhibition of renewal of the depth value in the depth buffer 6 and the read out data from the accentuating color register 4 instead of the output data from the DDA 2o is written into the color buffer 5, so as to fill and draw a polygon accentuating its edge line with high quality in the color buffer 5. In this condition, the contents of the depth buffer 6 are not renewed at all. Thereafter, the DDAs 2x, 2z and 2o are operated to fill and draw the polygon permitting depth value writing into the depth buffer 6 and with inhibiting color data writing into the color buffer 5. The contents of the depth buffer 6 are accordingly suited to the polygon which is to be filled and drawn with accentuation of its edge lines without influencing the contents of the color buffer 5.

As is apparent from the foregoing, the apparatus can remarkably easily draw edge lines with high quality by using elements as they are which are arranged in conventional graphics display apparatus and merely arranging the operation control in a different manner than the conventional graphics display apparatus. The time period for filling and drawing the polygon which is to be accentuated in its edge lines is a little more than twice the time period for ordinary filling of the polygon. Filling and drawing of a polygon with accentuation of its edge lines is performed with remarkably high speed.

Third Embodiment

FIG. 4 is a flowchart for a polygon filling method for accentuating the edge lines thereof as another embodiment of an illustrative drawing method according to the present invention.

This method differs from the first embodiment in that step (17) for drawing edge lines with the hidden surface removing processings based upon depth buffer. In the hereinafter described example of this embodiment, the algorithm is added between steps (7) and (8). A edge lines of the polygon P3 are positioned on the rear side of the polygon P2.

This method performs filling of the polygon P2 while inhibiting renewal of only the depth value in the depth buffer 6 after the polygons P1, P4 and P5 are filled by hidden surface removing processings as is shown in FIGS. 2-B2 and 2 C2. The contents of the depth buffer 6 are not changed at all as are shown in FIG. 2-C6, while the content of the color buffer 5 are changed as are shown in FIG. 2-B6. Then the method draws the edge lines while inhibiting renewal of only the depth value in the depth buffer 6. The contents of the depth buffer 6 are not changed at all as are shown in FIG. 2-C7, while the contents of the color buffer 5 are changed as are shown in FIG. 2 B7. Then the method fills the polygon P2 while inhibiting renewal of only the color data in the color buffer 5. The contents of the color buffer 5 are not changed at all as are shown in FIG. 2-B8, while the contents of the depth buffer 6 are changed as are shown in FIG. 2-C8. Thereafter, the method draws the edge lines while inhibiting renewal of only the color data in the color buffer 5. The contents of the color buffer 5 are not changed at all as are shown in FIG. 2-B9, while the contents of the depth buffer 6 are changed as are shown in FIG. 2-C9.

After the filling and drawing of the polygon P2 which is to be filled and drawn accentuating its edge lines are finished, the polygon P3 is filled and drawn in the same manner. The display on the scope, or the content of the color buffer 5 is changed as is shown in FIG. 2-B10, while the contents of the depth buffer 6 are changed as are shown in FIG. 2-C10.

The depth values are determined within the entire extent of the edge lines when the edge lines partially exist outside of the original polygon. The disadvantage can be eliminated that the quality of the edge lines be lowered due to other polygons being filled after the filling and drawing of the polygon accentuating its edge lines.

The polygon filling apparatus for accentuating its edge lines shown in FIG. 3 may be arranged as follows.

The processor 1 supplies necessary data to the DDAs 2x, 2z and 2o for generating necessary pixel data once when polygons are ordinarily filled. On the other hand, the processor 1 supplies necessary data to the DDAs 2x, 2z and 2c for generating pixel data which are necessary for filling the polygon and pixel data which are necessary for drawing the edge lines twice when polygons are filled and drawn with accentuation of their edge lines. The renewal control section 8 permits data writing into the color buffer 5 and the depth buffer 6 through the bidirectional buffers 62 and 72 when polygons are ordinarily filled. On the other hand, the renewal control section 8 performs the control operation as follows when polygons are filled and drawn with accentuating their edge lines. The renewal control section 8 inhibits data writing only through the bidirectional buffer 62 when polygons are filled for the first time and edge lines are drawn. The renewal control section 8 inhibits data writing only through the bodirectional buffer 72 when polygons are filled for the second time and edge lines are drawn.

When this arrangement is employed, filling and drawing of polygons with accentuation of their edge lines are performed with high quality with the polygon filling method shown in FIG. 4.

In each embodiment, the description is made for the case that polygons are filled and drawn with accentuation of their edge lines. Hidden line removing processings for a wire frame model are easily performed with high quality by filling polygons with background color. It is possible for an arbitrary line segment to be drawn inside of a polygon instead of edge lines. It is also possible that for arbitrary polygon to be drawn inside of a polygon.

The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

What is claimed is:

1. A figure drawing method comprising:
   generating color data corresponding to addresses sequentially generated by line segment generating means;
   filling a polygon based upon color data and depth data, by applying hidden surface removing processings based upon a depth buffer algorithm while inhibiting renewal of depth data in a depth buffer and while allowing renewal of color data;
   drawing a figure based upon color data and depth data by applying hidden surface removing processings based upon said depth buffer algorithm; and
   filling said polygon based upon color data and depth data by applying hidden surface removing processings based upon said depth buffer algorithm while inhibiting renewal of color data and while allowing renewal of depth data in said depth buffer.

2. A figure drawing method as set forth in claim 1, further comprising the step of
   drawing the figure by applying hidden surface removing processings based upon said depth buffer algorithm with inhibiting of renewal of color data while allowing renewal of depth data in said depth buffer, after drawing of said polygon by applying hidden surface removing processings based upon said depth buffer algorithm with inhibiting of renewal of color data while allowing renewal of depth data in said depth buffer.

3. A figure drawing method as set forth in claim 1, wherein the figure is at least one edge line of said polygon.

4. A figure drawing apparatus comprising:
   pixel data generating means for individually outputting first pixel data for filling a polygon which constitutes a three dimensional object, and second pixel data for drawing a desired figure;
   linear interpolation means for generating three dimensional coordinates data including plane coordinates data and depth data of a line segment portion of the polygon and of the desired figure based upon said first and second pixel data;
   color data generating means for generating color data, based upon said first and second pixel data, said generated color data corresponding to the three dimensional coordinates data generated by said linear interpolation means;
   a depth buffer for holding said depth data included in the three dimensional coordinates data generated by said linear interpolation means;
   a color buffer for holding the color data generated by said color data generating means;
   repetition control means for controlling said pixel data generating means to repeat outputting said first and second pixel data; and
   renewal control means for selectively inhibiting renewal of the depth data and renewal of the color data corresponding to the number of time of repetition by said repetition control means.

* * * * *